Dec. 27, 1955 J. J. A. VAN DER KAA ET AL 2,728,245
RATCHET MECHANISM FOR PRECISION GEARS
Filed Nov. 28, 1952 2 Sheets-Sheet 1

Inventors
Jean J. A. van der Kaa +
Anton Kopp
By Young, Emery & Thompson
Attys.

Dec. 27, 1955   J. J. A. VAN DER KAA ET AL   2,728,245
RATCHET MECHANISM FOR PRECISION GEARS
Filed Nov. 28, 1952                              2 Sheets-Sheet 2
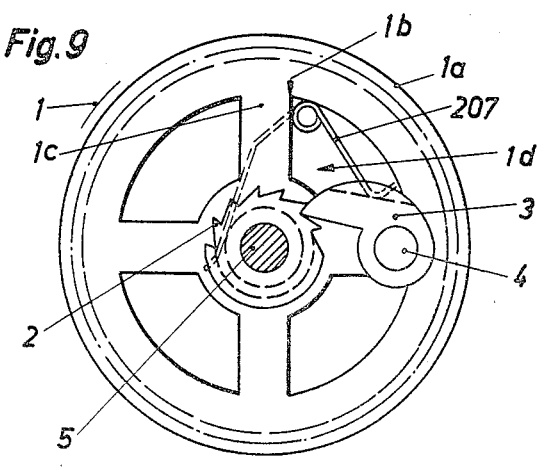
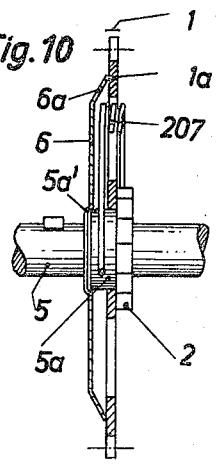
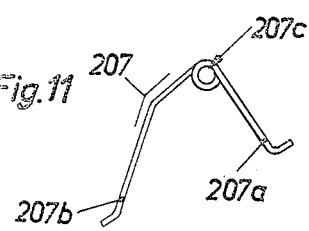
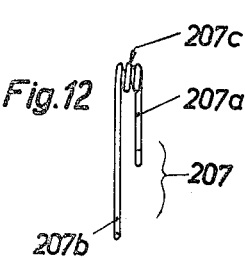
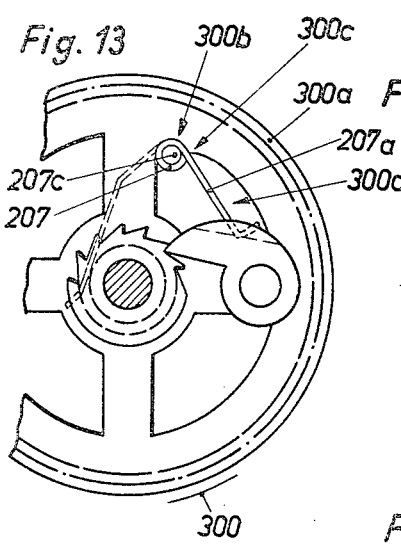
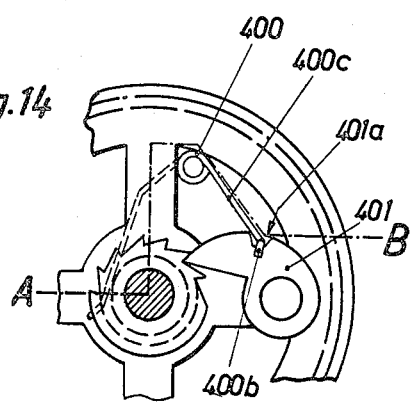
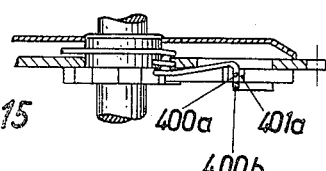
Inventors
Jean J. A. van der Kaa +
Anton Kopp
By Young, Emery & Thompson Attys.

United States Patent Office 2,728,245
Patented Dec. 27, 1955

2,728,245

RATCHET MECHANISM FOR PRECISION GEARS

Jean J. A. van der Kaa, Jupille, Belgium, and Anton Kopp, Schramberg (Schwarzwald), Germany, assignors to Gebrüder Junghans A. G., Schramberg (Schwarzwald), Germany Application November 28, 1952, Serial No. 322,918

6 Claims. (Cl. 74—577)

The invention relates to ratchet mechanisms for precision gears, more especially clock mechanisms in which a click is positively held by a click spring in engagement with the ratchet wheel, and is concerned with that particular type of ratchet mechanism in which a click spring fabricated from wire is incorporated in the mechanism without using special securing means such as rivets or screws. The object of the present invention is to provide a ratchet mechanism which can be easily assembled by the particular shaping of its elements and has a long useful life. Since breakages of the click spring are a comparatively frequent reason for repairs, especially in alarm clocks, it is a further object of the invention to construct and arrange the click spring in such manner that it can be easily removed from an assembled clock mechanism or can be fitted into such a mechanism.

The ratchet mechanism according to the invention meets these conditions; it is characterised by the fact that the click spring comprises two arms which are at an angle to one another and which are in two parallel planes, the spacing of which is at least equal to the thickness of the ratchet wheel, and a vertex element connecting the two arms, and this click spring is so incorporated in the ratchet mechanism that the vertex of the spring is supported on the edge of an opening in the wheel, whereas one arm bears positively on the click and the other arm on a local abutment.

It has already been proposed in ratchet mechanisms for a click spring bent-out of wire to be secured without rivets or screws by the fact that the anchoring end of the click spring is wound half around a wheel spoke, provided for this purpose with a special notch, and the other end is placed over the back of the click in such manner that the click spring is itself positively secured. However, this arrangement necessitates a complicated shape for the click spring which makes it more expensive to manufacture and results in unfavourable conditions for the stressing thereof and for the reliable seating thereof on the ratchet mechanism. On the contrary, the mechanism according to the invention has the advantage that the click spring is capable of being manufactured simply on commercially available automatic spring-making machines and also that the spring, owing to its peculiar shaping and three-point support on the click, the ratchet wheel and a local abutment, can be fitted and removed in a simple manner, has a reliable seating in the ratchet mechanism and, due to the action of the functional forces on the ends of the long arms of the spring, there is ensured a soft spring action and consequently a long useful life.

In a preferred constructional form of the ratchet mechanism according to the invention, one arm of the spring is so constructed that it can be supported with a sliding action on the ratchet shaft as its abutment.

In another constructional form of the invention, the vertex of the spring, instead of forming a straight web, can be formed as a helical spring having more than one full turn. Preferably, in this constructional form, the vertex of the spring consists of 2½ turns and, in order to ensure a reliable seating of this spring vertex on the edge of the aperture in the gear wheel, this aperture can be adapted to be rounding of the spring vertex.

Further advantages and features will be apparent from the following description of six constructional examples, such as may be employed for example as winding ratchets in alarm clocks.

Figure 1:
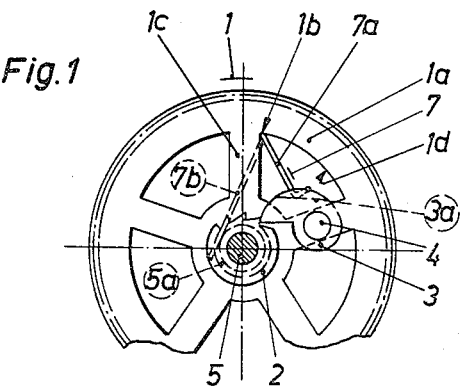
Figure 1 shows a first constructional form in front elevation.
Figure 2:
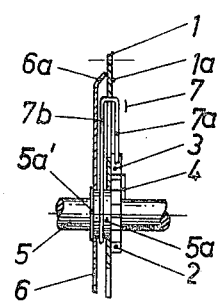
Figure 2 is a side elevation of Figure 1, partially in section.
Figure 7:
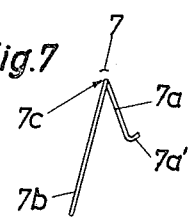
Figure 8:
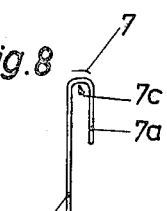

Figures 7 and 8 show the click spring according to Figures 1 and 2, in front elevation and side elevation, Figure 9 is a fourth constructional form in front elevation, seen from the side of the click, Figure 10 is a side elevation corresponding to Figure 9, partly in section, Figures 11 and 12 show the click spring of the fourth constructional form on its own, in front and side elevation, Figure 13 is a fifth constructional form in front elevation, Figure 14 is a sixth constructional form in front elevation and, Figure 15 is a section through Figure 14 on the line A—B.

In the constructional examples shown in Figures 1 and 2, 1 indicates the toothed wheel which will be referred to hereinafter as the gear wheel, 2 is the ratchet wheel, 3 the click, 4 the mounting rivet for the click 3, 5 is the ratchet shaft and 6 is the so-called friction disc. The ratchet wheel 2 is made fast with the shaft 5. The gear wheel can be rotated freely on a thickened part 5a of the shaft. The friction disc 6 is riveted at 5a' with the shaft collar 5a and is resiliently supported with its bent-over edge 6a on the wheel rim 1a.

The parts 1 to 6 do not differ in any way from those of a conventional winding ratchet for alarm clocks. However, the click spring now to be described is novel; referring to Figures 7 and 8, this spring comprises a two-armed wire spring having a short arm 7a and a long arm 7b, these arms being connected at the vertex 7c by a short transversely extending vertex part. In the assembled position (Figs. 1 and 2), the short arm 7a, which is bent up slightly at the ends in order to form a kind of shoe, is supported on the click 3 which is provided in the usual manner with a slot 3a; the vertex 7c is supported in the angle 1b (Figure 1) between the wheel-spoke 1c and the wheel rim 1a and the long arm 7b bears laterally on the circumference of the thickened shaft section 5a. The click spring 7 is assembled with initial tension in the usual manner and it will be seen that the vertex 7c has acting therein a component force urging the latter into the angle 1b. The fitting of the click spring is effected in a simple manner by the spring being gripped by pliers on the short arm, the long arm being introduced through that cut-out 1d of the wheel which is closest to the click 3 and being fitted in the space between the wheel 1 and the friction disc 6 until the spring arm 7b bears on the thickened part 5a of the ratchet shaft and the vertex piece 7c takes up a position in the angle 1b. Against the tension of the spring, the short arm 7a is then bent out until it can be placed with its end 7a' in the slot 3a on the click 3. The ratchet mechanism is now ready for use. The click spring is prevented from being detached laterally from the spring wheel by the bearing of the spring arm on the latter, or on the friction disc 6. Both arms 7a and 7b participate in the spring action.

Figure 3:
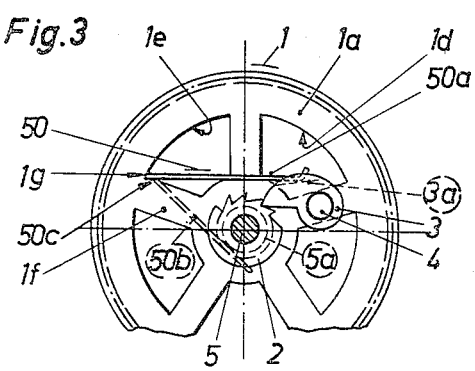
Figure 3 is a section constructional form in front elevation.
Figure 4:
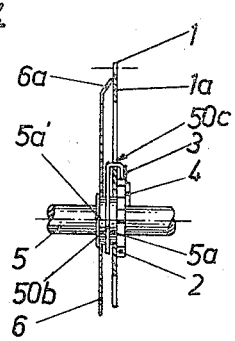
Figure 4 is a side elevation of Figure 3 partly in section.

In the constructional example shown in Figures 3 and 4, the same locking parts are used, except for the click spring, as in the example according to Figures 1 and 2. The click spring, which is indicated as a unit by the reference 50, differs from the spring shown in Figures 1, 2, 7 and 8 by the fact that the two arms 50a and 50b of the spring are made substantially of the same length; this is made possible by the fact that the vertex 50c of the spring is not supported in that cut-out 1d of the wheel which is closest to the click 3, but in the next but one cut-out 1e (Figure 3); the supporting angle between the wheel spoke 1f and the wheel rim 1a is indicated at 1g. In this constructional form, the bending moments acting on the spring arm 50a are more favourable than with the spring according to Figures 1 and 2, so that a softer spring action is obtained and if desired it is also possible to use a stronger spring wire.

Figure 5:
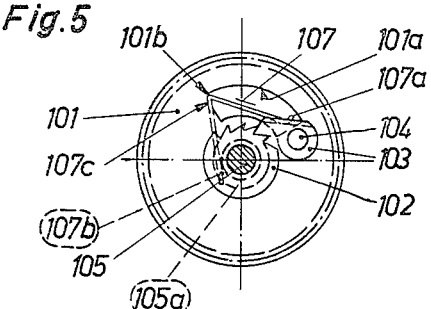
Figure 5 is a third constructional form in front elevation.
Figure 6:
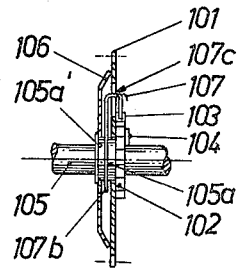
Figure 6 is a side elevation of Figure 5, partly in section.

Figures 5 and 6 show as a third constructional example a winding ratchet for small clocks in which a disc wheel 101 without spokes is generally employed as the spring wheel. 102 represents the ratchet, 103 the click, 104 the supporting rivet, 105 the shaft, 105a the thickened part thereof, 105a' the supporting edge for the friction disc 106 and 107 the click spring as a unit.

Formed in the wheel 101 is a segmental aperture 101a similar to that in a spoked wheel and also in a similar manner the spring 107 is supported in this opening with its vertex 107c in the angle 101b, while the arm 107a is supported on the click 103 and the arm 107b on the shaft collar 105a. The two arms 107a and 107b of the spring 107 are of substantially the same length in this example.

In the constructional example shown in Figures 9 to 12, the parts 1 to 6 are made in exactly the same way as in the first and second constructional examples (Figures 1 to 4). However, the click spring which is shown as a unit at 207 is different. It is made as a two-armed wire spring (see more especially Figures 11 and 12) with a short arm 207a and a long arm 207b, and both arms are connected at their vertex 207c by a helically wound part of the spring.

In the assembled position, the short spring arm 207a, which is bent-up at the end to form a shoe, is supported on the click 3. By means of its vertex 207c, the click spring is supported in the angle 1b (Figure 9) between the wheel spoke 1c and the wheel rim 1a. The long arm 207b bears laterally on the circumference of the shaft collar 5a.

The click spring 207 is fitted with initial tension and it will be appreciated that the vertex 207c has acting thereon a component force urging the latter into its abutment.

In the fifth constructional example shown in Figure 13, means are provided in order to prevent the slipping of the vertex 207c of the click spring on the inner edge of the wheel rim 300a. For this purpose, the cut-out 300d of the wheel is rounded at 300b to correspond to the curvature of the vertex 207c of the spring; furthermore, the edge of the cut-out 300d comprises at 300c a nose-shaped projection against which the spring vertex 207c can be supported.

In the sixth constructional example (Figures 14 and 15), in which again the abutment for the spring vertex 400 could be constructed in the same manner as the abutment 300b/300c in Figure 13, a cut-out 401a is arranged on the back of the click 401 for supporting the click spring in the plane of the gear wheel and the end of the arm 400c of the click spring has a saddle-shaped bent portion 400a/400b by which the end of the spring arm is supported in the cut-out 401a on the click 401.

We claim:

1. In combination with a ratchet mechanism for precision gearing, more especially clock mechanisms, a ratchet wheel mounted on a ratchet wheel shaft, a click co-operating therewith, a friction disk mounted on the shaft, a gear wheel mounted on the said shaft and carrying said click and rotatable with respect to and positioned between the ratchet wheel and the friction disk, a click spring of wire supported in an opening of the gear wheel and comprising two arms enclosing an angle with one another and disposed in parallel planes spaced apart by a distance at least equal to the thickness of the gear wheel, the spring having a vertex part connecting the two arms, and the click spring being so positioned in the ratchet mechanism that the spring vertex is supported on an edge forming the opening in the gear wheel with one arm positively extending into the interspace between the gear wheel and the friction disk bearing on an abutment therein and the other arm bearing on the click.

2. In combination with a ratchet mechanism according to claim 1, characterised in that the other arm extending into the interspace between the friction disc and the gear wheel of the spring is constructed to bear against the shaft of the gear wheel constituting said abutment.

3. In combination with a ratchet mechanism according to claim 1, characterised in that the vertex part of the click spring is formed of more than one complete turn of the spring and preferably of two and a half turns.

4. In combination with a ratchet mechanism according to claim 1, characterised in that the part of the gear wheel against which the spring vertex abuts is adapted to the shape of said vertex.

5. In combination with a ratchet mechanism according to claim 1, characterised in that the gear wheel is provided with spokes and the click spring is supported with its vertex located in one of the angles between a spoke and the wheel rim.

6. In combination with a ratchet mechanism according to claim 1, characterised in that the click is provided with a recess and the corresponding arm of the click spring has a saddle-shaped bend at its end with which it is supported in the said recess on the click.

References Cited in the file of this patent
UNITED STATES PATENTS

| | | |
|---|---|---|
| 169,804 | Hamblin | Nov. 9, 1875 |
| 508,845 | Schaller | Nov. 14, 1893 |
| 656,380 | Smith | Aug. 20, 1900 |
| 1,338,641 | Lux | Apr. 27, 1920 |
| 1,386,400 | Gettle et al. | Aug. 2, 1921 |
| 2,705,428 | McCullough | Apr. 5, 1955 |